(12) United States Patent
Sun et al.

(10) Patent No.: US 9,423,067 B2
(45) Date of Patent: Aug. 23, 2016

(54) COLLAPSIBLE STAND

(71) Applicant: MYWISH INFORMATION CORP, Taipei (TW)

(72) Inventors: Wei Nien Sun, Taipei (TW); Sheng Wei Tsai, Taipei (TW); Jia Qi Wu, Taipei (TW)

(73) Assignee: MYWISH INFORMATION CORP, Taipei (TW)

( * ) Notice: Subject to any disclaimer, the term of this patent is extended or adjusted under 35 U.S.C. 154(b) by 0 days.

(21) Appl. No.: 14/711,764

(22) Filed: May 13, 2015

(65) Prior Publication Data
US 2016/0076692 A1 Mar. 17, 2016

(30) Foreign Application Priority Data
Sep. 16, 2014 (TW) .............................. 103216411 U

(51) Int. Cl.
*F16M 11/00* (2006.01)
*F16M 11/22* (2006.01)
*F16M 13/02* (2006.01)
*A47B 97/04* (2006.01)
*A47B 23/04* (2006.01)

(52) U.S. Cl.
CPC .............. *F16M 11/22* (2013.01); *A47B 23/042* (2013.01); *A47B 97/04* (2013.01); *F16M 13/022* (2013.01); *A47B 2023/049* (2013.01)

(58) Field of Classification Search
CPC . F16M 11/22; F16M 13/022; F16M 2200/08; A47B 23/042; A47B 23/043; A47B 97/04; A47B 2023/049
USPC ......................................... 248/461, 460, 165
See application file for complete search history.

(56) References Cited

U.S. PATENT DOCUMENTS

| 2,146,702 | A | * | 2/1939 | Botham | G09F 3/20 248/441.1 |
|---|---|---|---|---|---|
| 3,692,281 | A | * | 9/1972 | Clayton | E01F 9/012 256/1 |
| 3,999,734 | A | * | 12/1976 | Gibson | A47B 7/142 211/2 |
| 4,957,263 | A | * | 9/1990 | Leluan, Jr. | A47F 7/0064 248/176.1 |
| 5,607,135 | A | * | 3/1997 | Yamada | A47B 23/043 248/447 |
| 6,113,052 | A | * | 9/2000 | Gentile | A47B 23/043 108/9 |
| 6,565,058 | B1 | * | 5/2003 | Holland | B42F 1/006 24/503 |
| 6,676,100 | B2 | * | 1/2004 | Hsu | G09F 1/14 248/441.1 |
| 6,776,385 | B1 | * | 8/2004 | Chang | A47B 23/043 248/448 |
| 2004/0007649 | A1 | * | 1/2004 | Vettraino | F16M 11/10 248/127 |
| 2010/0090085 | A1 | * | 4/2010 | Corrion | A47B 23/043 248/459 |

* cited by examiner

*Primary Examiner* — Anita M King

(57) ABSTRACT

A collapsible stand has a first member and a second member. The first member has a containment portion and an engaging portion, a circumference of the containment portion further has a first connecting portion, the second member has an accepting portion and a slot, a circumference of the second member further has a second connecting portion, and the second member engages with the engaging portion of the first member.

8 Claims, 10 Drawing Sheets

COLLAPSIBLE STAND

BACKGROUND OF THE INVENTION

1. Field of the Invention

The present invention relates to a collapsible stand, and more particularly to a collapsible stand for portable devices and tables.

2. Description of Prior Art

In modern life style, most of people have one or more than one portable electronic devices, which also creates numerous accessory products.

For example, a stand is a very popular accessory, which can allow the user to watch the device comfortable and hand-free. However, some stands are not universal for all different devices or itself is not portable and easy to storage.

Therefore, it is desirable to provide a collapsible stand to mitigate and/or obviate the aforementioned problems.

SUMMARY OF THE INVENTION

In order to achieve the above-mentioned objective, collapsible stand includes a first member and a second member. The first member has a containment portion and an engaging portion, a circumference of the containment portion further has a first connecting portion, the second member has an accepting portion and a groove, a circumference of the second member further has a second connecting portion, and the second member engages with the engaging portion of the first member.

DETAILED DESCRIPTION OF THE INVENTION

Figure 1:
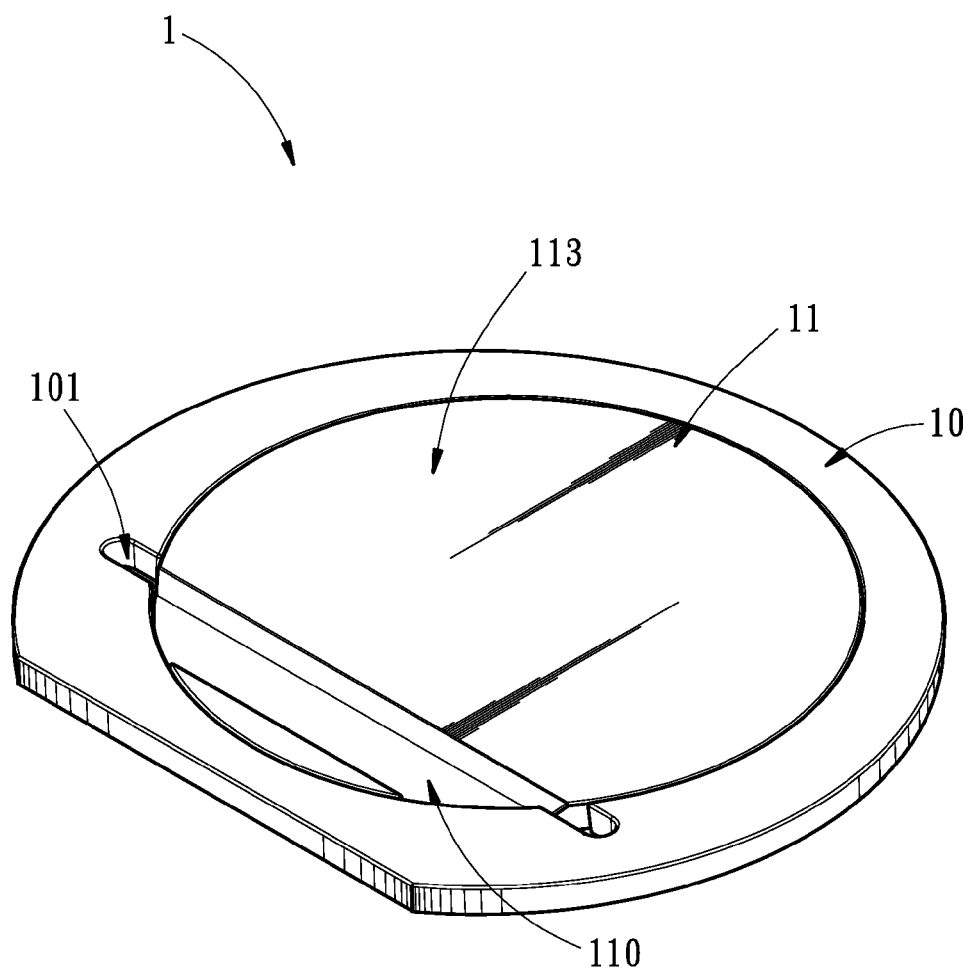
FIG. 1 is a perspective drawing of a collapsible stand according to an embodiment of the present invention.
Figure 2:
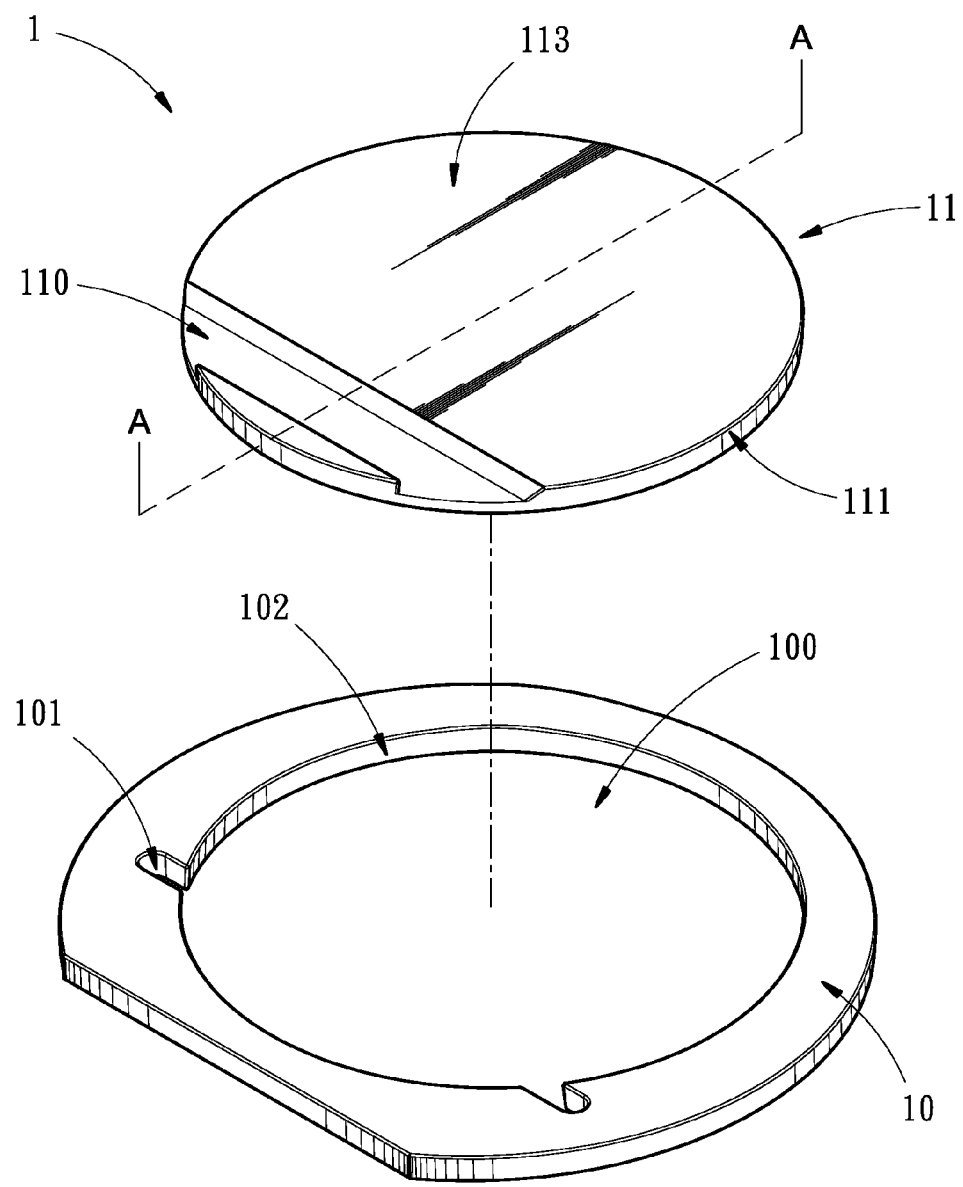
FIG. 2 is an exploded schematic drawing of collapsible stand according to the embodiment of the present invention.
Figure 3:
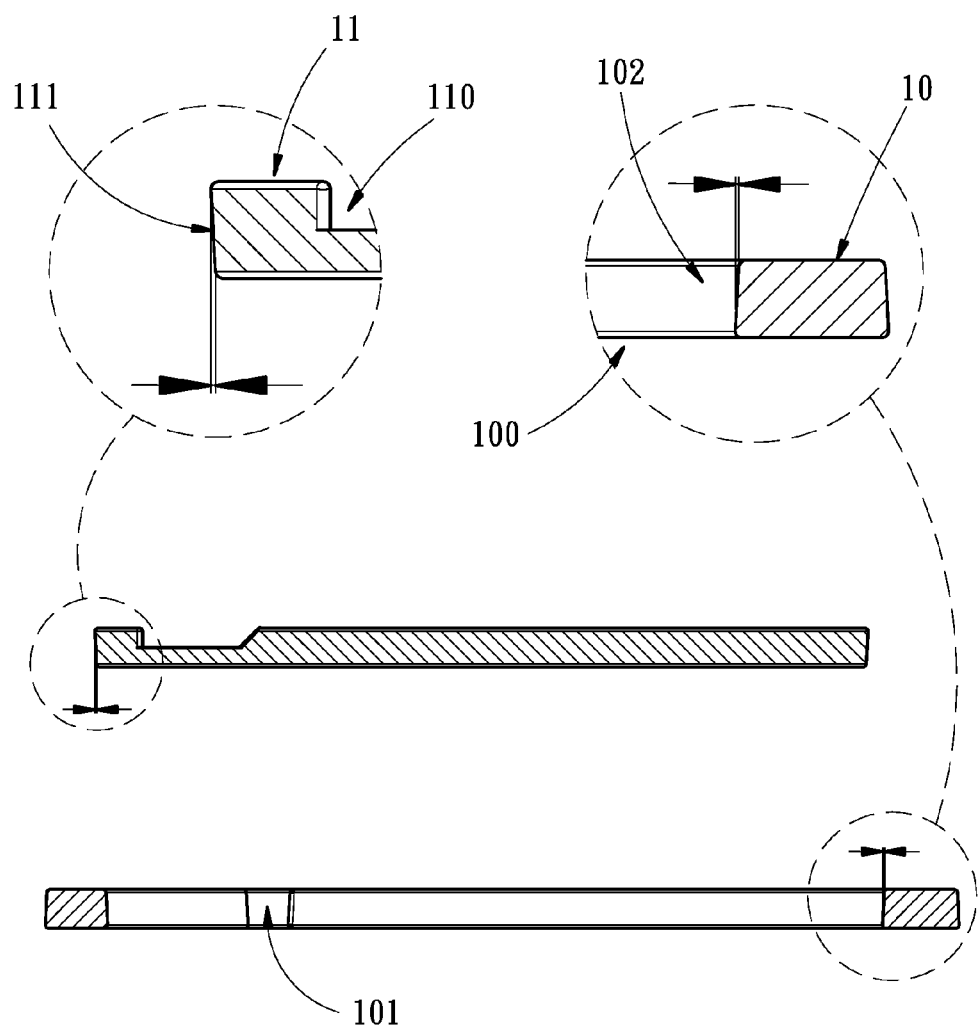
FIG. 3 is a cross-sectional schematic combination drawing of a first member and a second member according to the embodiment of the present invention.

Please refer to FIG. 1 and FIG. 2. A collapsible stand 1 comprises a first member 10 and a second member 11. The first member 10 has a similar D shape and a hollow out containment portion 100. A first connecting portion 102 of the containment portion 100 further has an engaging portion 101 separately at two sides. The first connecting portion 102 has an inclined surface which is corresponding to the second member 11. Furthermore, the engaging portion 101 is configured for engaging with the second member 11.

The second member 11 comprises an accepting portion 113 with a groove 110, the second connecting portion 111 has an inclined surface which is corresponding to the first member 10. The first member 10 and the second member 11 of collapsible stand 1 are capable of being collapsed together or engaging with each other to provide a stable stand.

Please refer to FIG. 3, FIG. 4, FIG. 5 and FIG. 6. When the collapsible stand 1 is collapsed, the second connecting portion 111 of the second member 11 and the first connecting portion 102 of the first member 10 engage with each other, wherein the first connecting portion 102 and the second connecting portion 111 both have corresponding inclined surfaces for tight engagement.

Figure 4:
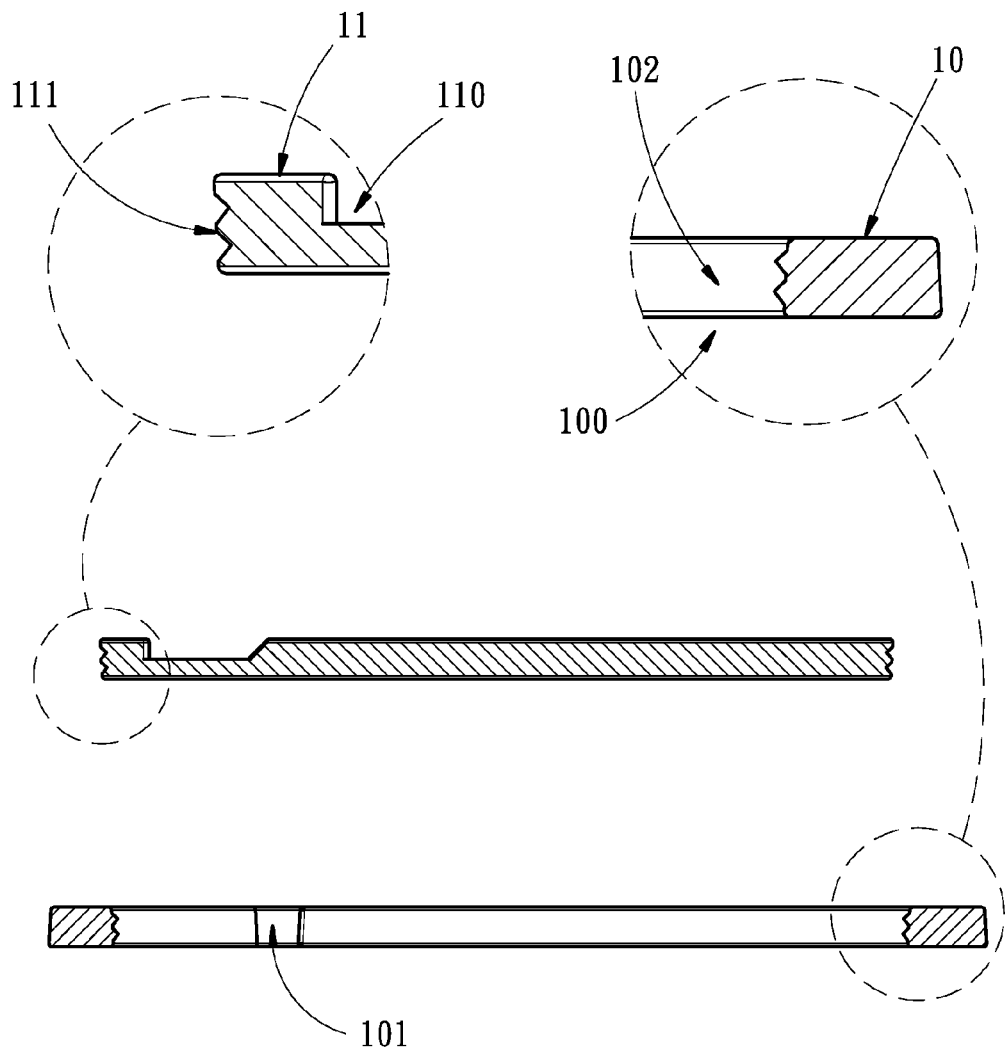
FIG. 4 is a cross-sectional schematic combination drawing of the first member and the second member according to another embodiment of the present invention.
Figure 5:
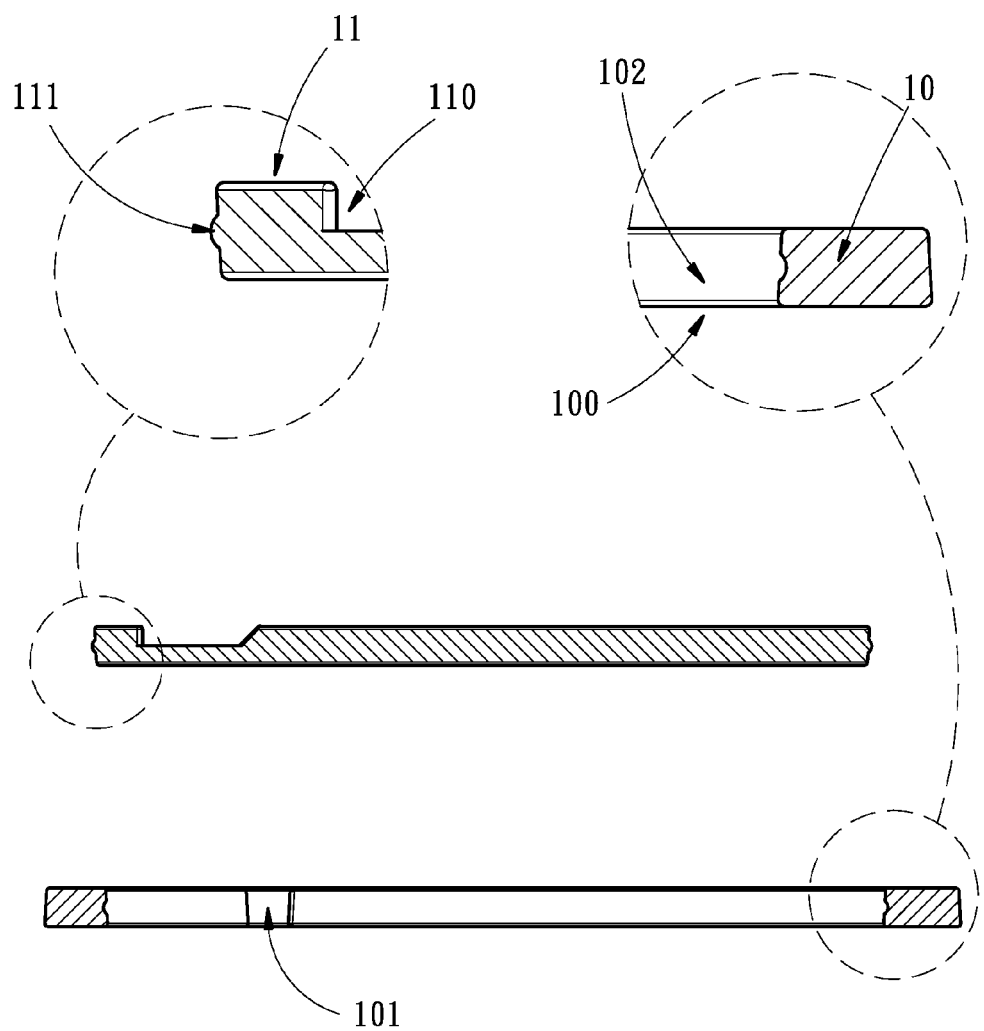
FIG. 5 is a cross-sectional schematic combination drawing of a first member and a second member according to another embodiment of the present invention.

However, corresponding surfaces of the first connecting portion 102 and the second connecting portion 111 can also be correspondingly threaded (as shown in FIG. 4) or correspondingly male and female relationship (as shown in FIG. 5).

Figure 6:
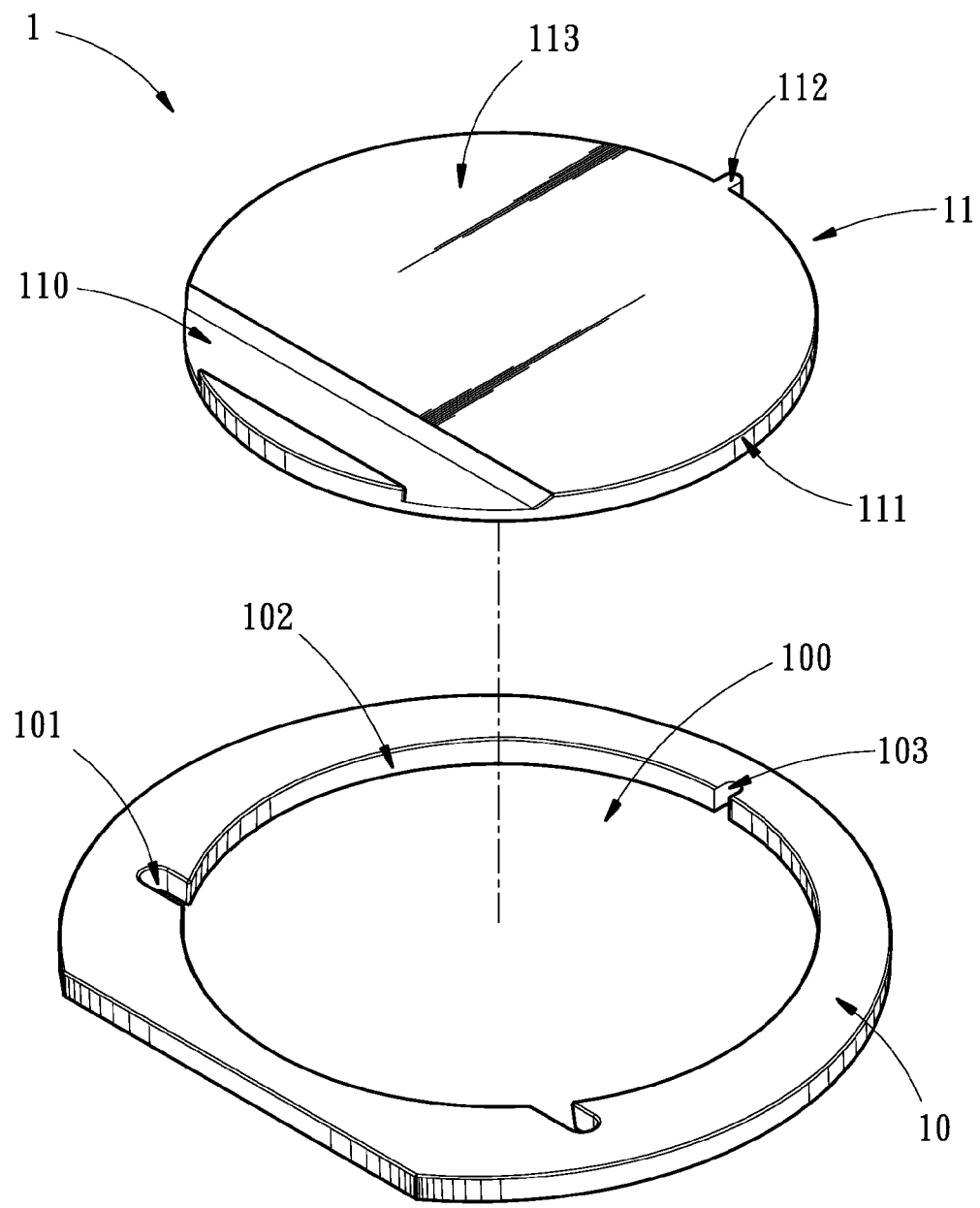
FIG. 6 is a schematic drawing of a securing design according to the embodiment of the present invention.
Figure 7:
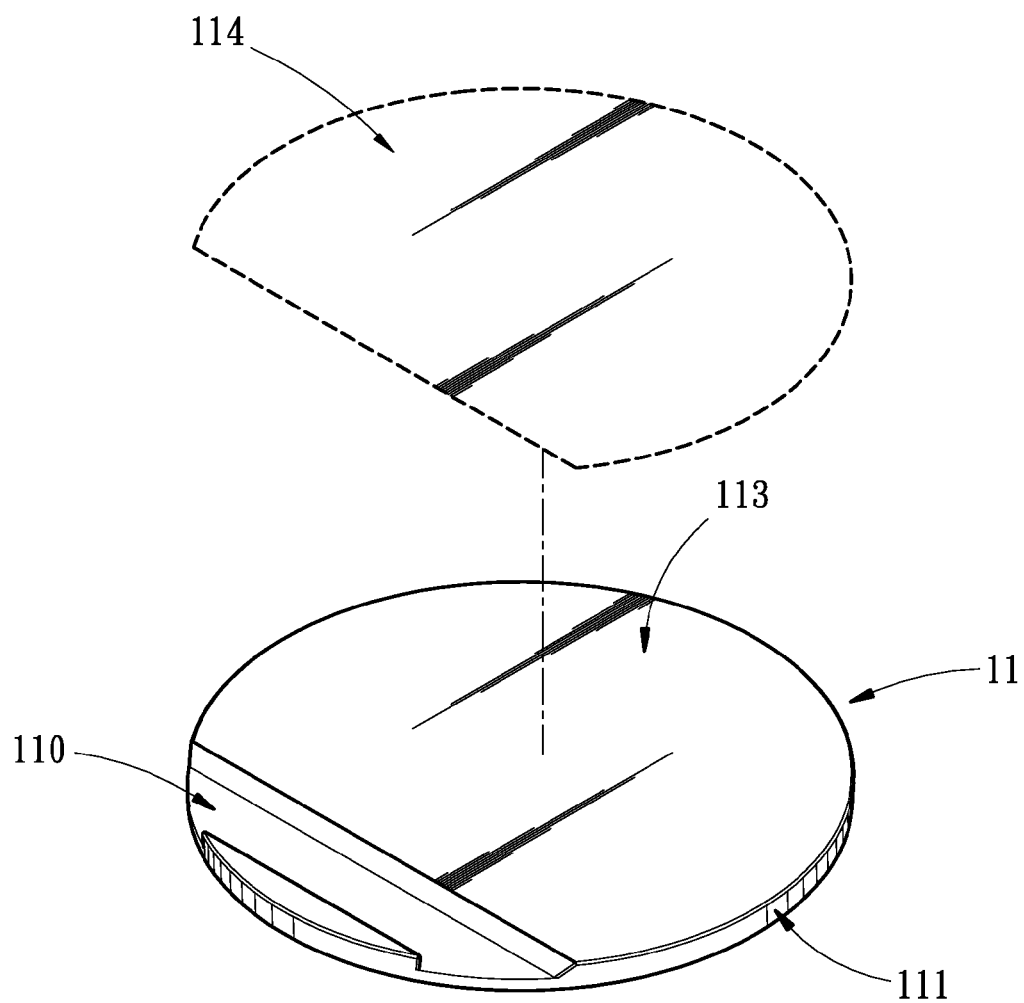
FIG. 7 is a schematic drawing of an accepting portion of the second member according to the embodiment of the present invention.
Figure 8:
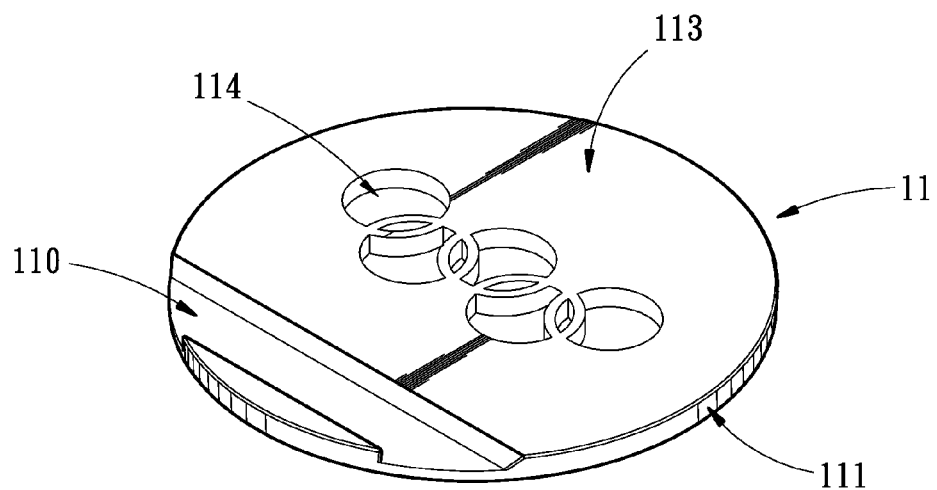
FIG. 8 is a schematic drawing of the accepting portion of the second member according to another embodiment of the present invention.

Moreover, in order to improve the horizontal alignment between the first member 10 and the second member 11, the first connecting portion 102 of the first member 10 further has a indented portion 103, the second connecting portion 111 of the second member 11 further has a corresponding protruding portion 112 (as shown in FIG. 6). Therefore, the second member 11 and the first member 10 can be more precisely collapsed together.

Please refer to FIG. 7, FIG. 8, FIG. 9 and FIG. 10. The accepting portion 113 of the second member 11 can be adhered or printed with various designs or hollowed out with various designs 114. Similarly, one side of the first member 10 can also be adhered or printed with various designs or hollowed out with various designs 114.

Figure 9:
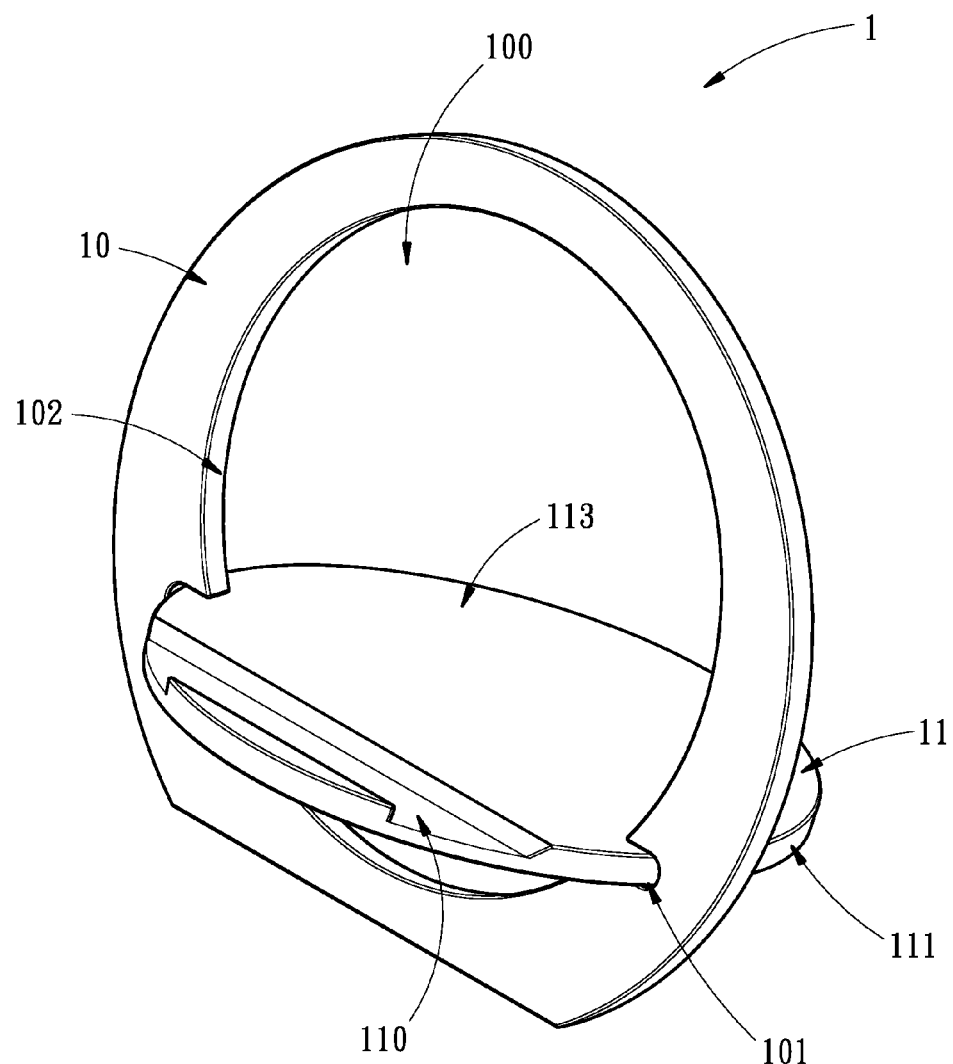
FIG. 9 is a schematic combination drawing of the first member and the second member according to the embodiment of the present invention.
Figure 10:
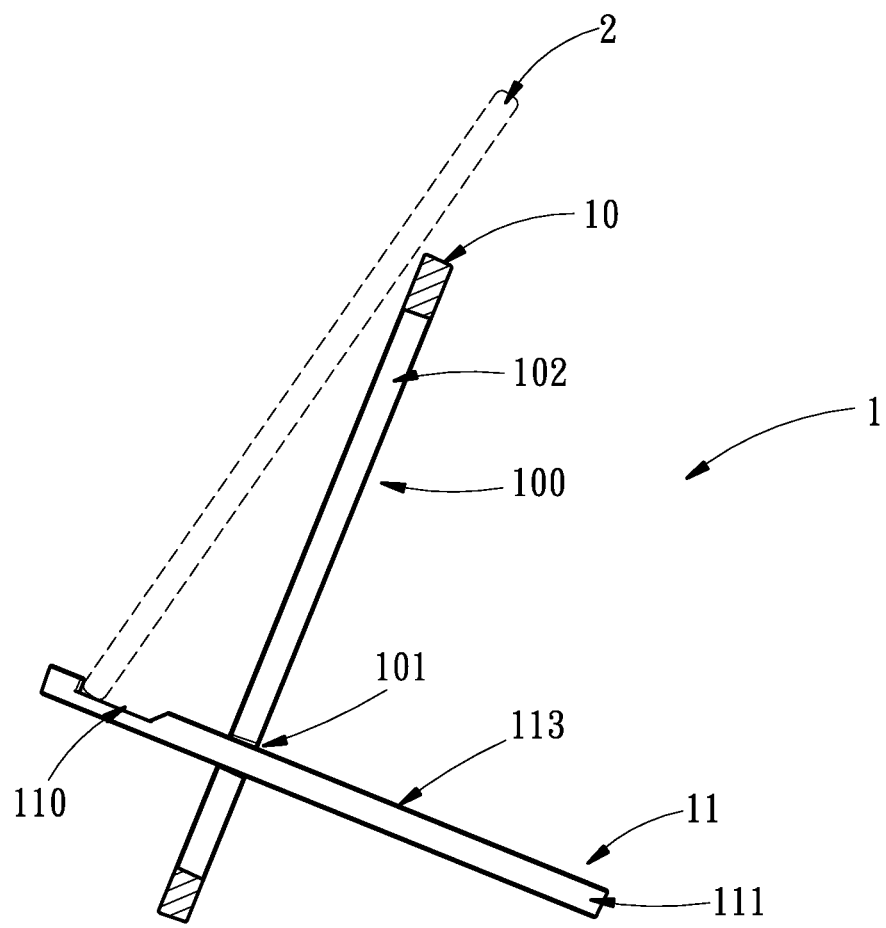
FIG. 10 is a schematic drawing of the collapsible stand according to the embodiment of the present invention.

As shown in FIG. 9 and FIG. 10, when the collapsible stand 1 is opened up, the second member 11 is engaged with the first member 10 at the engaging portion 101 of the first member 10. Since the second member 11 has a diameter larger than a distance between the two engaging portions 101 of the first connecting portion 102 of the first member 10, the second member 11 can be inserted between the two engaging portions 101 to form the stand 1. With the groove 110 of the second member 11, various portable device or tablet devices 2 can be placed on the stand 1 stably.

Although the present invention has been described with reference to the foregoing preferred embodiments, it will be understood that the invention is not limited to the details thereof. Various equivalent variations and modifications can still occur to those skilled in this art in view of the teachings of the present invention. Thus, all such variations and equivalent modifications are also embraced within the scope of the invention as defined in the appended claims.

What is claimed is:

1. A collapsible stand comprising a first member and a second member, characterized in that:
    the first member has a containment portion for accepting the second member in a first orientation parallel to the containment portion, and an engaging portion for engaging the second member in a second orientation passing through the containment portion, a circumference of the containment portion further comprising a first connecting portion, and the second member has an accepting portion and a groove, a circumference of the second member further comprising a second connecting portion corresponding to the first connecting portion, wherein a width of the second member is greater than a width of the engaging portion so that the second member engages with the engaging portion of the first member when in the second orientation to create a stand to support a device using the groove.

2. The collapsible stand as claimed in claim 1, wherein the first connecting portion and the second connecting portion of the first member and the second member have corresponding inclined surfaces.

3. The collapsible stand as claimed in claim 1, wherein the first connecting portion and the second connecting portion of the first member and the second member have corresponding threaded surfaces.

4. The collapsible stand as claimed in claim 1, wherein the first connecting portion and the second connecting portion of the first member and the second member have corresponding paired female and male surfaces.

5. The collapsible stand as claimed in claim 1, wherein the first member and the second member further comprise corresponding paired female and male portions.

6. The collapsible stand as claimed in claim 1, wherein the accepting portion of the second member comprises an adhered or printed design or is recessed with a design.

7. The collapsible stand as claimed in claim 1, wherein the first member comprises an adhered or printed design or is recessed with a design.

8. The collapsible stand as claimed in claim 1, wherein the engaging portion comprises a first slot at a first location in first connecting portion and a second slot at a second location in the first connecting portion, the second member configured to pass through the containment portion and the first and second slots when in the second orientation to create the stand to support a device using the groove.

* * * * *